United States Patent
Mizuta et al.

(10) Patent No.: US 10,647,821 B2
(45) Date of Patent: May 12, 2020

(54) PRODUCTION PROCESS FOR SILICONE POLYMER

(71) Applicant: Toray Fine Chemicals Co., Ltd., Tokyo (JP)

(72) Inventors: Masayuki Mizuta, Moriyama (JP); Hiroyasu Seki, Moriyama (JP); Hisatake Kobayashi, Ichihara (JP); Hidetoshi Kato, Moriyama (JP)

(73) Assignee: Toray Fine Chemicals Co., Ltd., Tokyo (JP)

( * ) Notice: Subject to any disclaimer, the term of this patent is extended or adjusted under 35 U.S.C. 154(b) by 23 days.

(21) Appl. No.: 16/068,932

(22) PCT Filed: Dec. 7, 2016

(86) PCT No.: PCT/JP2016/086328
§ 371 (c)(1),
(2) Date: Jul. 10, 2018

(87) PCT Pub. No.: WO2017/122465
PCT Pub. Date: Jul. 20, 2017

(65) Prior Publication Data
US 2019/0023848 A1  Jan. 24, 2019

(30) Foreign Application Priority Data
Jan. 12, 2016  (JP) .................. 2016-003305

(51) Int. Cl.
| | |
|---|---|
| *C08G 77/08* | (2006.01) |
| *C08G 77/06* | (2006.01) |
| *C08G 77/00* | (2006.01) |
| *C08G 77/14* | (2006.01) |
| *C08G 77/20* | (2006.01) |
| *C08L 83/06* | (2006.01) |
| *C08G 77/32* | (2006.01) |

(52) U.S. Cl.
CPC ............ *C08G 77/06* (2013.01); *C08G 77/14* (2013.01); *C08G 77/20* (2013.01); *C08G 77/32* (2013.01); *C08G 77/80* (2013.01); *C08L 83/06* (2013.01); *C08G 77/08* (2013.01); *C08G 77/70* (2013.01)

(58) Field of Classification Search
CPC ................................ C08G 77/06; C08G 77/08
See application file for complete search history.

(56) References Cited

U.S. PATENT DOCUMENTS

| | | | | |
|---|---|---|---|---|
| 3,433,764 A | * | 3/1969 | Walmsley | C08G 77/06 528/14 |
| 5,401,821 A | * | 3/1995 | Geck | B01D 19/0409 528/12 |
| 2005/0165197 A1 | * | 7/2005 | Ogihara | C08G 77/06 528/32 |
| 2008/0290521 A1 | * | 11/2008 | Hamada | C08G 77/08 257/759 |
| 2013/0149455 A1 | * | 6/2013 | Ooike | C08G 77/18 427/387 |

FOREIGN PATENT DOCUMENTS

| | | |
|---|---|---|
| JP | 2008-019423 A | 1/2008 |
| JP | 2009-030006 A | 2/2009 |
| JP | 2009-030007 A | 2/2009 |
| JP | 2009-126940 A | 6/2009 |
| JP | 2010-085893 A | 4/2010 |
| JP | 2010-085912 A | 4/2010 |
| JP | 2010-112966 A | 5/2010 |
| WO | 2007/114253 A1 | 10/2007 |

* cited by examiner

*Primary Examiner* — Margaret G Moore
(74) *Attorney, Agent, or Firm* — DLA Piper LLP (US)

(57) ABSTRACT

A process of producing a silicone polymer includes hydrolyzing/condensating one or more compound in the presence of a base, thereby producing a silicone polymer that has an organic acid content of 0.0001 to 0.03 parts by weight with respect to 100 parts by weight of the silicone polymer. The process for producing a silicone polymer makes it possible to inhibit an increase in the molecular weight of a silicone polymer during high-temperature concentration in the steps of producing a silicone polymer.

16 Claims, 1 Drawing Sheet

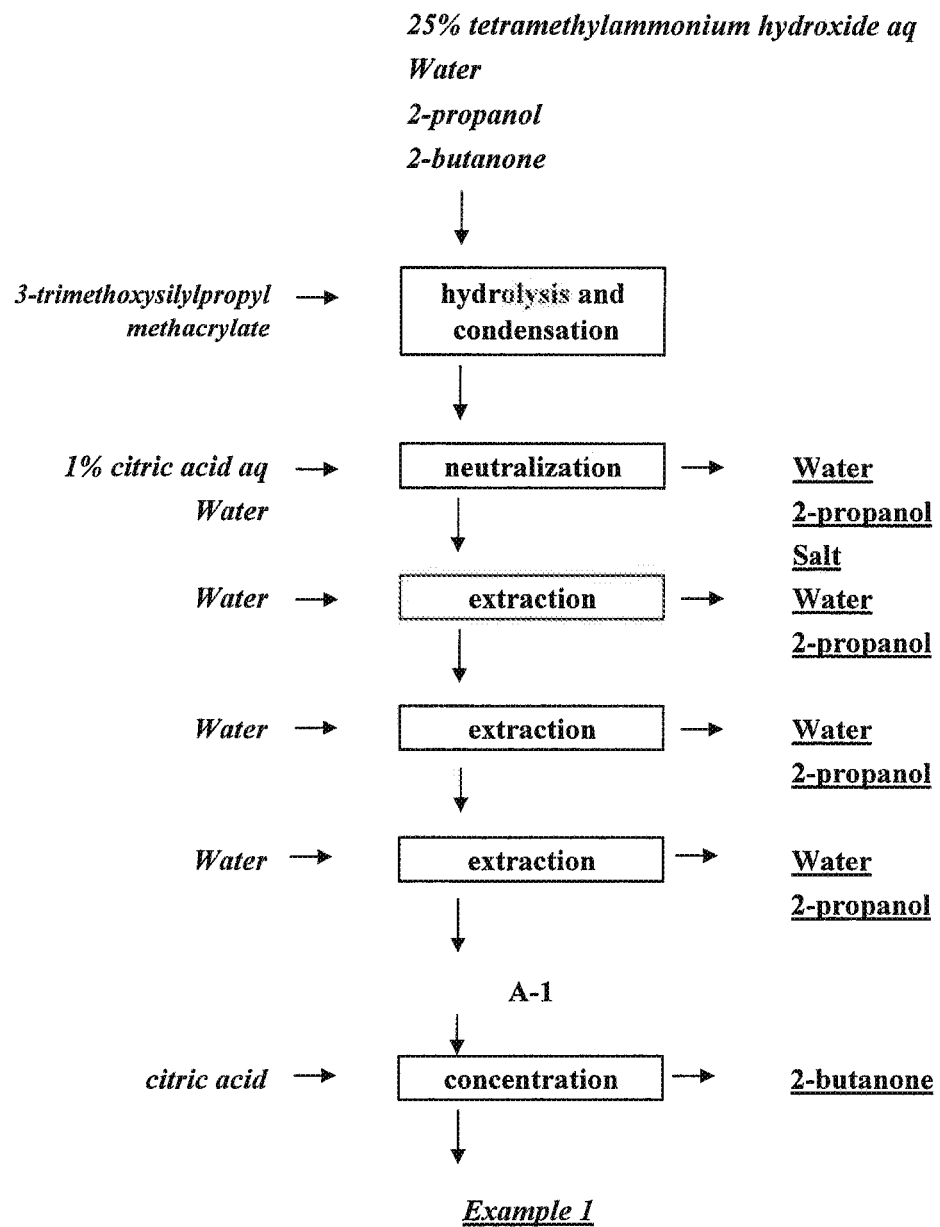

PRODUCTION PROCESS FOR SILICONE POLYMER

TECHNICAL FIELD

This disclosure relates to a process of producing a silicone polymer.

BACKGROUND

An electronic material used for electronic components such as liquid crystal display elements and semiconductor elements are required to have excellent visible light permeability and properties such as heat resistance, chemical resistance, and crack resistance, with which an electronic material can tolerate various treatment steps during production of such elements. Silicone polymers have been gaining attention because they have properties such as excellent visible light permeability and heat resistance.

A silicone polymer can be synthesized by conducting a hydrolysis-condensation reaction of a hydrolyzable silicon compound in the presence of a base and then removing a solvent or a by-product by, for example, concentration or the like. In a hydrolysis reaction, a hydrolyzable substituent bound to a silicon atom is hydrolyzed, which results in formation of a silanol group. A condensation reaction between this silanol group and another silanol group or an unreacted hydrolyzable group further takes place, which results in formation of a siloxane bond. This reaction is repeatedly induced. Thus, a silicone polymer is formed. In the condensation reaction, not every silanol group is consumed, and there are some silanol groups remaining after the reaction. When such highly reactive silanol groups remain, silanol groups react by condensation reaction during high-temperature concentration. Accordingly, the molecular weight of a silicone polymer increases compared to silicone before concentration. Therefore, it has so far been impossible to obtain a silicone polymer having desired properties.

Various studies have been made to improve stability of a composition containing such silicone polymer. For example, a process comprising adding an acid to a composition containing a silicone polymer such that the acid content is 0.1 parts by weight with respect to 100 parts by weight of the silicone polymer is disclosed (Japanese Unexamined Patent Publication (Kokai) No. 2010-112966 A). However, in that process, an acid added in a large amount causes deterioration of properties of a silicone polymer upon production of an element. In addition, since an acid is added after production of a silicone polymer in such process, a silicone polymer is denatured during concentration that is carried out at a high temperature upon production of a silicone polymer, making it impossible to obtain a silicone polymer of interest.

There has been a demand for a process of producing a silicone polymer, that does not influence properties of a silicone polymer upon production of an element, and by which it is possible to inhibit an increase in the molecular weight of a silicone polymer during concentration in the steps of producing a silicone polymer.

It could therefore be helpful to provide a process that makes it possible to inhibit an increase in the molecular weight of a silicone polymer during high-temperature concentration in the steps of producing a silicone polymer.

SUMMARY

We thus provide:

A process of producing a silicone polymer comprises hydrolyzing/condensating one or more compound in the presence of a base, thereby producing a silicone polymer that has an organic acid content of 0.0001 to 0.03 parts by weight with respect to 100 parts by weight of the silicone polymer, wherein the compound is selected from the group consisting of:

a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group; a compound represented by Formula (2):

$$R^4Si(OR^5)_3 \qquad (2)$$

where $R^4$ represents a hydrocarbon group, a glycidyl group, or a methacryloyl group, and
$R^5$ represents a hydrocarbon group; and
a compound represented by Formula (3):

$$Si(OR^6)_4 \qquad (3)$$

where $R^6$ represents a hydrocarbon group.

It is thus possible to inhibit an increase in the molecular weight of a silicone polymer during high-temperature concentration in the steps of producing a silicone polymer.

It is also possible to reduce changes in solubility of a silicone polymer in an alkaline solution during high-temperature concentration in the steps of producing a silicone polymer.

A silicone polymer produced by the process of producing a silicone polymer is less likely to experience an increase in the molecular weight or a change in viscosity during long-term storage and, therefore, it is excellent in storage stability.

A silicone polymer produced by the process of producing a silicone polymer is useful as a heat-resistant material for electronic components such as liquid crystal display elements and semiconductor elements.

A silicone polymer produced by the process of producing a silicone polymer can be applied to a wide range of fields of paints, adhesives and the like.

DETAILED DESCRIPTION

The process of producing a silicone polymer is the process comprising hydrolyzing/condensating one or more compound in the presence of a base, thereby producing a silicone polymer having an organic acid content of 0.0001 to 0.03 parts by weight with respect to 100 parts by weight of the silicone polymer, wherein the compound being selected from the group consisting of:

a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group; a compound represented by Formula (2):

$$R^4Si(OR^5)_3 \qquad (2)$$

where $R^4$ represents a hydrocarbon group, a glycidyl group, or a methacryloyl group, and
$R^5$ represents a hydrocarbon group; and
a compound represented by Formula (3):

$$Si(OR^6)_4 \qquad (3)$$

where $R^6$ represents a hydrocarbon group.

For the compound represented by Formula (1), $R^1$ and $R^2$ each may represent a hydrocarbon group, a glycidyl group, or a methacryloyl group, and organic groups of $R^1$ and $R^2$ may be the same or different:

$$R^1R^2Si(OR^3)_2 \quad (1).$$

Preferably, a hydrocarbon group is a $C_1$-$C_{20}$ linear hydrocarbon group, a branched hydrocarbon group, a cyclic hydrocarbon groups, or an aromatic hydrocarbon group.

Preferably, a $C_1$-$C_{20}$ linear hydrocarbon is a methyl group, an ethyl group, a vinyl group, an n-propyl group, an n-butyl group, or an n-pentyl group.

Preferably, a branched hydrocarbon group is an iso-propyl group, an iso-butyl group, sec-butyl, a t-butyl group, a 2-ethylbutyl group, a 3-ethylbutyl group, or a 2,2-diethylpropyl group.

Preferably, a cyclic hydrocarbon group is a cyclopropyl group, a cyclobutyl group, a cyclopentyl group, a cyclohexyl group, a cyclohexenyl group, a cyclohexenylethyl group, a cyclooctanyl group, a cyclopentadienyl group, a bicycloheptenyl group, a bicycloheptyl group, or an adamantyl group.

Preferably, an aromatic hydrocarbon group is a phenyl group, a benzyl group, a phenethyl group, a phenylpropyl group, a cinnamyl group, a styryl group, a trityl group, a toluyl group, a naphthyl group, a cumenyl group, a mesyl group, a xylyl group, or a methoxybenzyl group.

Of these hydrocarbon groups, a methyl group, an ethyl group, a vinyl group, an n-propyl group, a cyclopropyl group, a cyclobutyl group, a cyclopentyl group, a cyclohexyl group, an adamantyl group, a phenyl group, a benzyl group, and a methoxybenzyl group are more preferable.

Preferably, a glycidyl group is a 3-glycidyloxypropyl group or a 2-(3,4-epoxycyclohexyl)ethyl group.

Preferably, a methacryloyl group is a 3-methacryloxypropyl group.

$R^3$ represents a hydrocarbon group.

Preferably, a hydrocarbon group is a $C_1$-$C_{20}$ linear hydrocarbon group or a branched hydrocarbon group.

Preferably, a $C_1$-$C_{20}$ linear hydrocarbon group is a methyl group, an ethyl group, or an n-propyl group.

Preferably, a branched hydrocarbon group is a hydrocarbon group such as an iso-propyl group.

Therefore, specific examples of the compound represented by Formula (1) include dimethyldimethoxysilane, dimethyldiethoxysilane, dimethyldi-n-propoxysilane, dimethyldi-iso-propoxysilane, diethyldimethoxysilane, diethyldiethoxysilane, diethyldi-n-propoxysilane, diethyldi-iso-propoxysilane, divinyldimethoxysilane, divinyldiethoxysilane, divinyldi-n-propoxysilane, divinyldi-iso-propoxysilane, di-n-propyltrimethoxysilane, di-n-propyltriethoxysilane, di-n-propyldi-n-propoxysilane, di-n-propyldi-iso-propoxysilane, di-n-butyldimethoxysilane, di-n-butyldiethoxysilane, di-n-butyl di-n-propoxysilane, di-n-butyldi-iso-propoxysilane, di-n-pentyldimethoxysilane, di-n-pentyldiethoxysilane, di-n-pentyldi-n-propoxysilane, di-n-pentyldi-iso-propoxysilane, di-iso-propyldimethoxysilane, di-iso-propyldiethoxysilane, di-iso-propyldi-n-propoxysilane, di-iso-propyldi-iso-propoxysilane, di-iso-butyldimethoxysilane, di-iso-butyldiethoxysilane, di-iso-butyldi-n-propoxysilane, di-iso-butyldi-iso-propoxysilane, di-sec-butyldimethoxysilane, di-sec-butyldiethoxysilane, di-sec-butyldi-n-propoxysilane, di-sec-butyldi-iso-propoxysilane, di-t-butyldimethoxysilane, di-t-butyldiethoxysilane, di-t-butyldi-n-propoxysilane, di-t-butyldi-iso-propoxysilane, di-2-ethylbutyldimethoxysilane, di-2-ethylbutyldiethoxysilane, di-2-ethylbutyldi-n-propoxysilane, di-2-ethylbutyl di-iso-propoxysilane, di-3-ethylbutyldimethoxysilane, di-3-ethylbutyldiethoxysilane, di-3-ethylbutyldi-n-propoxysilane, di-3-ethylbutyl di-iso-propoxysilane, di-2,2-diethylpropyldimethoxysilane, di-2,2-diethylpropyldiethoxysilane, di-2,2-diethyldi-n-propoxysilane, di-2,2-diethylpropyldi-iso-propoxysilane, dicyclopropyldimethoxysilane, dicyclopropyldiethoxysilane, dicyclopropyldi-n-propoxysilane, dicyclopropyldi-iso-propoxysilane, dicyclobutyldimethoxysilane, dicyclobutyldiethoxysilane, dicyclobutyldi-n-propoxysilane, dicyclobutyldi-iso-propoxysilane, dicyclopentyldimethoxysilane, dicyclopentyldiethoxysilane, dicyclopentyldi-n-propoxysilane, dicyclopentyldi-iso-propoxysilane, dicyclohexyldimethoxysilane, dicyclohexyldiethoxysilane, dicyclohexyldi-n-propoxysilane, dicyclohexyldi-iso-propoxysilane, dicyclohexenyldimethoxysilane, dicyclohexenyldiethoxysilane, dicyclohexen-yldi-n-propoxysilane, dicyclohexenyldi-iso-propoxysilane, dicyclohexenylethyldimethoxysilane, dicyclohexenylethyldiethoxysilane, dicyclohexenylethyldi-n-propoxysilane, dicyclohexenyleth-yldi-iso-propoxysilane, dicyclooctanyldimethoxysilane, dicyclooctanyldiethoxysilane, dicyclo-octanyldi-n-propoxysilane, dicyclooctanyldi-iso-propoxysilane, dicyclopentadienylpropyldi-methoxysilane, dicyclopentadienylpropyldiethoxysilane, dicyclopentadienylpropyldi-n-propoxysilane, dicyclopentadienylpropyldi-iso-propoxysilane, dibicycloheptenyldimethoxysilane, dibicycloheptenyldiethoxysilane, dibicycloheptenyldi-n-propoxysilane, dibicycloheptenyldi-iso-propoxysilane, dibicycloheptyldimethoxysilane, dibicycloheptyldiethoxysilane, dibicyclo-heptyldi-n-propoxysilane, dibicycloheptyldi-iso-propoxysilane, diadamantyldimethoxysilane, diadamantyldiethoxysilane, diadamantyldi-n-propoxysilane, diadamantyldi-iso-propoxysilane, diphenyldimethoxysilane, diphenyldiethoxysilane, diphenyldi-n-propoxysilane, diphenyldi-iso-propoxysilane, dibenzyldimethoxysilane, dibenzyldiethoxysilane, dibenzyldi-n-propoxysilane, dibenzyldi-iso-propoxysilane, diphenethyldimethoxysilane, diphenethyldiethoxysilane, diphenethyldi-n-propoxysilane, diphenethyldi-iso-propoxysilane, diphenylpropyldimethoxysilane, diphenylpropyldiethoxysilane, diphenylpropyldi-n-propoxysilane, diphenylpropyldi-iso-propoxysilane, dicinnamyldimethoxysilane, dicinnamyldiethoxysilane, dicinnamyldi-n-propoxysilane, dicinnamyldi-iso-propoxysilane, distyryldimethoxysilane, distyryldiethoxysilane, distyryldi-n-propoxysilane, distyryldi-iso-propoxysilane, ditrityldimethoxysilane, ditrityldieth-oxysilane, ditrityldi-n-propoxysilane, ditrityldi-iso-propoxysilane, ditoluyldimethoxysilane, ditoluyldiethoxysilane, ditoluyldi-n-propoxysilane, ditoluyldi-iso-propoxysilane, dinaphthyldimethoxysilane, dinaphthyldiethoxysilane, dinaphthyldi-n-propoxysilane, dinaphthyldi-iso-propoxysilane, dicumenyldimethoxysilane, dicumenyldiethoxysilane, dicumenyldi-n-propoxysilane, dicumenyldi-iso-propoxysilane, dimesyltrimethoxysilane, dimesyldiethoxysilane, dimesyldi-n-propoxysilane, dimesyldi-iso-propoxysilane, dixylyldimethoxysilane, dixylyldieth-oxysilane, dixylyldi-n-propoxysilane, dixylyldi-iso-propoxysilane, dimethoxybenzyldimethoxysilane, dimethoxybenzyldiethoxysilane, dimethoxybenzyldi-n-propoxysilane, dimethoxybenzyl-di-iso-propoxysilane, di-3-glycidoxypropyldimethoxysilane, di-3-glycidoxypropyldiethoxysilane, di-3-glycidoxypropyldi-n-propoxysilane, di-3-glycidoxypropyldiso-propoxysilane, di-2-(3,4-epoxycyclohexyl)ethyldimethoxysilane, di-2-(3,4-epoxycyclohexyl)ethyldiethoxysilane, di-2-(3,4-epoxycyclohexyl)eth-yldi-n-propoxysilane, di-2-(3,4-epoxycyclohexyl)ethyldi-iso-propoxysilane, di-3-methacryloxypropyldimethoxysilane, di-3-methacryloxypropyldiethoxysilane, di-3-methacryloxypropyldi-n-propoxysilane, and di-3-methacryloxypropyldi-iso-propoxysilane.

Of these, dimethyldimethoxysilane, dimethyldiethoxysilane, dimethyl di-n-propoxysilane, dimethyldi-iso-propoxysilane, diethyldimethoxysilane, diethyldiethoxysilane, diethyl-di-n-propoxysilane, diethyldi-iso-propoxysilane, divinyldimethoxysilane, divinyldiethoxysilane, divinyldi-n-propoxysilane, divinyldi-iso-propoxysilane, di-n-propyldimethoxysilane, di-n-propyldiethoxysilane, di-n-propyldi-n-propoxysilane, di-n-propyldi-iso-propoxysilane, dicyclopro-pyldimethoxysilane, dicyclopropyldiethoxysilane, dicyclopropyldi-n-propoxysilane, dicyclopro-pyldi-iso-propoxysilane, dicyclobutyldimethoxysilane, dicyclobutyldiethoxysilane, dicyclobutyl-di-n-propoxysilane, dicyclobutyldi-iso-propoxysilane, dicyclopentyldimethoxysilane, dicyclo-pentyldiethoxysilane, dicyclopentyldi-n-propoxysilane, dicyclopentyldi-iso-propoxysilane, dicyclohexyldimethoxysilane, dicyclohexyldiethoxysilane, dicyclohexyldi-n-propoxysilane, dicyclohexyldi-iso-propoxysilane, diadamantyldimethoxysilane, diadamantyldiethoxysilane, diadamantyldi-n-propoxysilane, diadamantyldi-iso-propoxysilane, diphenyl dimethoxysilane, diphenyldiethoxysilane, diphenyldi-n-propoxysilane, diphenyldi-iso-propoxysilane, dibenzyldimethoxysilane, dibenzyldiethoxysilane, dibenzyldi-n-propoxysilane, dibenzyldi-iso-propoxysilane, dinaphthyldimethoxysilane, dinaphthyldiethoxysilane, dinaphthyldi-n-propoxysilane, dinaphthyldi-iso-propoxysilane, dimethoxybenzyldimethoxysilane, dimethoxybenzyldiethoxysilane, dimethoxybenzyldi-n-propoxysilane, dimethoxybenzyldi-iso-propoxysilane, di-2-(3,4-epoxycyclohexyl)dimethoxysilane, di-2-(3,4-epoxycyclohexyl)diethoxysilane, di-2-(3,4-epoxy-cyclohexyl)di-n-propoxysilane, di-2-(3,4-epoxycyclohexyl)di-iso-propoxysilane, di-3-glycidoxypropyldimethoxysilane, di-3-glycidoxypropyldiethoxysilane, di-3-glycidoxypropyldi-n-propoxysilane, di-3-glycidoxypropyldi-iso-propoxysilane, di-3-methacryloxypropyldimethoxysilane, di-3-methacryloxypropyldiethoxysilane, di-3-methacryloxypropyldi-n-propoxysilane, and di-3-methacryloxypropyldi-iso-propoxysilane are preferably used.

The compound represented by Formula (1) is more preferably dimethyldimethoxysilane, dimethyldiethoxysilane, diethyldimethoxysilane, diethyldiethoxysilane, divinyldimethoxysilane, divinyldiethoxysilane, di-n-propyldimethoxysilane, di-n-propyldiethoxysilane, diphenyldimethoxysilane, diphenyldiethoxysilane, dinaphthyldimethoxysilane, dinaphthyldiethoxysilane, dimethoxybenzyldimethoxysilane, dimethoxybenzyldiethoxysilane, di-2-(3,4-epoxycyclohexyl)dimethoxysilane, di-2-(3,4-epoxycyclohexyl)diethoxysilane, di-3-glycidoxypropyldimethoxysilane, di-3-glycidoxypropyldiethoxysilane, di-3-methacryloxypropyldimethoxysilane, or di-3-methacryloxypropyldiethoxysilane. The compound represented by Formula (1) is further preferably dim ethyl di methoxysilane, dimethyldiethoxysilane, diphenyldimethoxysilane, or diphenyldiethoxysilane.

The compound of Formula (2) is explained below:

$R^4$ represents a hydrocarbon group, a glycidyl group, or a methacryloyl group.

Preferable examples of a hydrocarbon group include $C_1$-$C_{20}$ linear hydrocarbon groups, branched hydrocarbon groups, cyclic hydrocarbon groups, and aromatic hydrocarbon groups.

Preferably, a $C_1$-$C_{20}$ linear hydrocarbon group is a hydrocarbon group such as a methyl group, an ethyl group, a vinyl group, an n-propyl group, an n-butyl group, or an n-pentyl group.

Preferably, a branched hydrocarbon group is a hydrocarbon group such as an iso-propyl group, an iso-butyl group, sec-butyl, a t-butyl group, a 2-ethylbutyl group, a 3-ethylbutyl group, and a 2,2-diethylpropyl group.

Preferably, a cyclic hydrocarbon group is a cyclopropyl group, a cyclobutyl group, a cyclopentyl group, a cyclohexyl group, a cyclohexenyl group, a cyclohexenylethyl group, a cyclooctanyl group, a cyclopentadienyl group, a bicycloheptenyl group, a bicycloheptyl group, or an adamantyl group.

Preferably, an aromatic hydrocarbon group is a phenyl group, a benzyl group, a phenethyl group, a phenylpropyl group, a cinnamyl group, a styryl group, a trityl group, a toluyl group, a naphthyl group, a cumenyl group, a mesyl group, a xylyl group, or a methoxybenzyl group.

Of these hydrocarbon groups, a methyl group, an ethyl group, a vinyl group, an n-propyl group, a cyclopropyl group, a cyclobutyl group, a cyclopentyl group, a cyclohexyl group, an adamantyl group, a phenyl group, a benzyl group, and a methoxybenzyl groups are more preferable.

Preferably, a glycidyl group is a 3-glycidyloxypropyl group or a 2-(3,4-epoxycyclohexyl)ethyl group.

Preferably, a methacryloyl group is a 3-methacryloxypropyl group.

$R^5$ represents a hydrocarbon group. Preferable examples of hydrocarbon groups include $C_1$-$C_{20}$ linear hydrocarbon groups and branched hydrocarbon groups.

Preferably, a $C_1$-$C_{20}$ linear hydrocarbon group is a methyl group, an ethyl group, and an n-propyl group.

Preferably, a branched hydrocarbon group is a hydrocarbon group such as an iso-propyl group.

Therefore, specific examples of the compound represented by Formula (2) include methyltrimethoxysilane, methyltriethoxysilane, methyltri-n-propoxysilane, methyltri-iso-propoxysilane, ethyltrimethoxysilane, ethyltriethoxysilane, ethyltri-n-propoxysilane, ethyltri-iso-propoxysilane, vinyltrimethoxysilane, vinyltriethoxysilane, vinyltri-n-propoxysilane, vinyltri-iso-propoxysilane, n-propyltrimethoxysilane, n-propyltriethoxysilane, n-propyltri-n-propoxysilane, n-propyltri-iso-propoxysilane, n-butyl trimethoxysilane, n-butyl triethoxysilane, n-butyl tri-n-propoxysilane, n-butyl tri-iso-propoxysilane, n-pentyltrimethoxysilane, n-pentyltriethoxysilane, n-pentyltri-n-propoxysilane, n-pentyltri-iso-propoxysilane, iso-propyltrimethoxysilane, iso-propyltriethoxysilane, iso-propyltri-n-propoxysilane, iso-propyltri-iso-propoxysilane, iso-butyl trimethoxysilane, iso-butyl triethoxysilane, iso-butyl tri-n-propoxysilane, iso-butyl tri-iso-propoxysilane, sec-butyl trimethoxysilane, sec-butyl triethoxysilane, sec-butyl tri-n-propoxysilane, sec-butyl tri-iso-propoxysilane, t-butyl trimethoxysilane, t-butyl triethoxysilane, t-butyl tri-n-propoxysilane, t-butyl tri-iso-propoxysilane, 2-ethylbutyl trimethoxysilane, 2-ethylbutyl triethoxysilane, 2-ethylbutyl tri-n-propoxysilane, 2-ethylbutyl tri-iso-propoxysilane, 3-ethylbutyl trimethoxysilane, 3-ethylbutyl triethoxysilane, 3-ethylbutyl tri-n-propoxysilane, 3-ethylbutyl tri-iso-propoxysilane, 2,2-diethylpropyltrimethoxysilane, 2,2-diethylpropyltrieth-oxysilane, tri-n-propoxysilane, 2,2-diethylpropyltri-iso-propoxysilane, cyclopropyltrimethoxysilane, cyclopropyltriethoxysilane, cyclopropyltri-n-propoxysilane, cyclopropyltri-iso-propoxysilane, cyclobutyl trimethoxysilane, cyclobutyl triethoxysilane, cyclobutyltri-n-propoxysilane, cyclobutyltri-iso-propoxysilane, cyclopentyltrimethoxysilane, cyclopentyltriethoxysilane, cyclopentyltri-n-propoxysilane, cyclopentyltri-iso-propoxysilane, cyclohexyltrimethoxysilane, cyclohexyltriethoxysilane, cyclohexyltri-n-propoxysilane, cyclohexyltri-iso-propoxysilane, cyclohexenyl trimethoxysilane, cyclohexenyl triethoxysilane, cyclohexenyl tri-n-propoxysilane, cyclohexenyl tri-iso-propoxysilane, cyclohexenyl ethyltrimethoxysilane, cyclohexenylethyltri-ethoxysilane, cyclohexenylethyltri-n-propoxysilane, cyclohexenylethyltri-iso-propoxysilane, cyclooctanyltrimethoxysilane, cyclooctanyltriethoxysilane, cyclooctanyltri-n-propoxysilane, cyclooctanyltri-iso-propoxysilane, cyclopentadienylpropyltrimethoxysilane, cyclopentadienyl-propyltriethoxysilane, cyclopentadienylpropyltri-n-propoxysilane, cyclopentadienylpropyltri-iso-propoxysilane, bicycloheptenyl trimethoxysilane, bicycloheptenyl triethoxysilane, bicycle-heptenyl tri-n-propoxysilane, bicycloheptenyl tri-iso-propoxysilane, bicycloheptyltrimeth-oxysilane, bicycloheptyltriethoxysilane, bicycloheptyltri-n-propoxysilane, bicycloheptyltri-iso-propoxysilane, adamantyl trimethoxysilane, adamantyl triethoxysilane, adamantyl tri-n-propoxysilane, adamantyl tri-iso-propoxysilane, phenyltrimethoxysilane, phenyltriethoxysilane, phenyltri-n-propoxysilane, phenyltri-iso-propoxysilane, benzyltrimethoxysilane, benzyl triethoxysilane, benzyl tri-n-propoxysilane, benzyl tri-iso-propoxysilane, phenethyltrimethoxysilane, phenethyltriethoxysilane, phenethyltri-n-propoxysilane, phenethyltri-iso-propoxysilane, phenylpropyltrimethoxysilane, phenylpropyltriethoxysilane, phenylpropyltri-n-propoxysilane, phenylpropyltri-iso-propoxysilane, cinnamyltriethoxysilane, cinnamyltri-n-propoxysilane, cinnamyltri-iso-propoxysilane, styryltrimethoxysilane, styryltriethoxysilane, styryltri-n-prop oxysilane, styryltri-iso-propoxysilane, trityltrimethoxysilane, styryltriethoxysilane, styryltri-n-propoxysilane, styryltri-iso-propoxysilane, toluyltrimethoxysilane, toluyltriethoxysilane, toluyl-trinpropoxysilane, toluyltri-iso-propoxysilane, naphthyltrimethoxysilane, naphthyltri ethoxysilane, naphthyltri-n-propoxysilane, naphthyltri-iso-propoxysilane, cumenyltrimethoxysilane, cumenyltriethoxysilane, cumenyltri-n-propoxysilane, cumenyltri-iso-propoxysilane, mesyltrimethoxysilane, mesyltriethoxysilane, mesyltri-n-propoxysilane, mesyltri-iso-propoxysilane, xylyltrimethoxysilane, xylyltriethoxysilane, xylyltri-n-propoxysilane, xylyltri-iso-propoxysilane, 4-methoxybenzyltrimethoxysilane, 4-methoxybenzyl triethoxysilane, 4-methoxybenzyltri-n-propoxysilane, 4-methoxybenzyl tri-iso-propoxysilane, 3-glycidoxypropyltrimethoxysilane, 3-glycidoxypropyl triethoxysilane, 3-glycidoxypropyl tri-n-propoxysilane, 3-glycidoxypropyl tri-iso-propoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyltri-n-propoxysilane, 2-(3,4-epoxycyclohexyl)eth-yltri-iso-propoxysilane, 3-methacryloxypropyltrimethoxysilane, 3-methacryloxypropyltriethoxysilane, 3-methacryloxypropyltri-n-propoxysilane, and 3-methacryloxypropyltri-iso-prop oxysilane.

Of these, methyltrimethoxysilane, methyltriethoxysilane, methyltri-n-propoxysilane, methyltri-iso-propoxysilane, ethyltrimethoxysilane, ethyltriethoxysilane, ethyltri-n-prop oxysilane, ethyltri-iso-propoxysilane, vinyltrimethoxysilane, vinyltriethoxysilane, vinyltri-n-propoxysilane, vinyltri-iso-propoxysilane, n-propyltrimethoxysilane, n-propyltriethoxysilane, n-propyltri-n-propoxysilane, n-propyltri-iso-propoxysilane, cyclopropyltrimethoxysilane, cyclopropyltriethoxysilane, cyclopropyltri-n-propoxysilane, cyclopropyltri-iso-propoxysilane, cyclobutyl trimethoxysilane, cyclobutyl triethoxysilane, cyclobutyl tri-n-propoxysilane, cyclobutyltri-iso-propoxysilane, cyclopentyltrimethoxysilane, cyclopentyltriethoxysilane, cyclopentyltri-n-propoxysilane, cyclopentyltri-iso-propoxysilane, cyclohexyltrimethoxysilane, cyclohexyltriethoxysilane, cyclohexyltri-n-propoxysilane, cyclohexyltri-iso-propoxysilane, adamantyl trimethoxysilane, adamantyl triethoxysilane, adamantyl tri-n-propoxysilane, adamantyl tri-iso-propoxysilane, phenyltrimethoxysilane, phenyltriethoxysilane, phenyltri-n-propoxysilane, phenyltri-iso-propoxysilane, benzyltrimethoxysilane, benzyl triethoxysilane, benzyl tri-n-propoxysilane, benzyl tri-iso-propoxysilane, naphthyltrimethoxysilane, naphthyltriethoxysilane, naphthyltri-n-propoxysilane, naphthyltri-iso-propoxysilane, 4-methoxybenzyltrimethoxysilane, 4-methoxybenzyltriethoxysilane, 4-methoxybenzyltri-n-propoxysilane, methoxybenzyl tri-iso-propoxysilane, 2-(3,4-epoxycyclohexyl)ethyltrimethoxysilane, 2-(3,4-epoxycyclohexyl)ethyltriethoxysilane, 2-(3,4-epoxycyclohexyl)tri-n-propoxysilane, 2-(3,4-epoxycyclohexyl)tri-iso-propoxysilane, 3-glycidoxypropyltrimethoxysilane, 3-glycidoxypropyl triethoxysilane, 3-glycidoxypropyl tri-n-propoxysilane, 3-glycidoxypropyl tri-iso-propoxysilane, 3-methacryloxypropyltrimethoxysilane, 3-methacryloxypropyltriethoxysilane, 3-methacryloxypropyltri-n-propoxysilane, and 3-methacryloxypropyltri-iso-propoxysilane are preferably used.

The compound represented by Formula (2) is more preferably methyltrimethoxysilane, methyltriethoxysilane, ethyltrimethoxysilane, ethyltriethoxysilane, vinyltrimethoxysilane, vinyltriethoxysilane, n-propyltrimethoxysilane, n-propyltriethoxysilane, phenyltrimethoxysilane, phenyltriethoxysilane, naphthyltrimethoxysilane, naphthyltriethoxysilane, 4-methoxybenzyltrimethoxysilane, 4-methoxybenzyl triethoxysilane, 2-(3,4-epoxycyclohexyl)ethyltrimethoxysilane, 2-(3,4-epoxycyclohexyl)ethyltriethoxysilane, 3-glycidoxypropyltrimethoxysilane, 3-glycidoxypropyl triethoxysilane, 3-methacryloxypropyltrimethoxysilane, or 3-methacryloxypropyltriethoxysilane. The compound represented by Formula (2) is further preferably methyltrimethoxysilane, phenyltrimethoxysilane, 3-glycidoxypropyltrimethoxysilane, 3-methacryloxypropyltrimethoxysilane, or 4-methoxybenzyltrimethoxysilane.

The compound of Formula (3) is explained below:

$$Si(OR^6)_4 \qquad (3).$$

$R^6$ represents a hydrocarbon group. A hydrocarbon group is preferably a $C_1$-$C_{20}$ linear hydrocarbon group or a branched hydrocarbon group.

Preferably, a $C_1$-$C_{20}$ linear hydrocarbon group is a methyl group, an ethyl group, or an n-propyl group.

Preferably, a branched hydrocarbon group is a hydrocarbon group such as an iso-propyl group.

More preferably, $R^6$ represents a $C_1$-$C_5$ alkyl group. In view of the ease of acquisition of starting materials, particularly preferably, $R^6$ represents a methyl group or an ethyl group.

Therefore, the compound represented by Formula (3) is preferably tetramethoxysilane, tetraethoxysilane, tetra-n-propoxysilane, or tetra-iso-propoxysilane. Of these, tetramethoxysilane, tetraethoxysilane or the like is preferably used in view of the ease of acquisition of starting materials.

As the compound represented by Formulae (1), (2), or (3), one compound may be used singly or two or more different compounds may be simultaneously used. It is also possible to mix two or more different compounds prior to a hydrolysis-condensation reaction and use the mixture.

According to the process of producing a silicone polymer, the process is comprising hydrolyzing/condensating one or more compound in the presence of a base.

Examples of a base include: inorganic bases such as ammonia, sodium hydroxide, potassium hydroxide, barium hydroxide, and calcium hydroxide; and organic bases such as triethylamine, monoethanolamine, diethanolamine, dimethylmonoethanolamine, monomethyldi-ethanolamine, triethanolamine, diazabicyclooctane, diazabicyclononane, diazabicycloundecene, pyridine, pyrrole, piperazine, pyrrolidine, piperazine, picoline, trimethylamine, tetrabutyl ammonium fluoride, benzyl tributyl ammonium chloride, benzyl triethylammonium chloride, benzyl trimethylammonium chloride, tetra-n-butyl ammonium chloride, tetraethylammonium chloride, tetramethylammonium chloride, benzyl tri-n-butyl ammonium bromide, benzyl triethylammonium bromide, benzyl trimethylammonium bromide, n-octyl trimethylammonium bromide, hexyltrimethylammonium bromide, tetrabutyl ammonium bromide, tetraethylammonium bromide, tetradecyl trimethylammonium bromide, tetramethylammonium bromide, tetra-n-propylammonium bromide, tetrabutylammonium iodide, tetraethylammonium iodide, tetramethyl ammonium iodide, tetra-n-propylammonium iodide, trimethylphenylammoniumiodide, benzyl trimethylammonium hydroxide, phenyltrimethylammonium hydroxide, tetrabutyl ammonium hydroxide, tetraethyl ammonium hydroxide, tetramethylammonium hydroxide, tetrapropylammonium hydroxide, tetrabutyl ammonium hydrogen sulfate, tetrabutyl ammonium tetrafluoroborate, tetramethylammonium thiocyanate, and tetramethylammonium-p-toluene sulfonate.

A base is preferably a quaternary ammonium salt. Examples of a quaternary ammonium salt include benzyl tributyl ammonium chloride, benzyl trimethylammonium chloride, tetra-n-butyl ammonium chloride, tetramethylammonium chloride, benzyl tri-n-butyl ammonium bromide, benzyl trimethylammonium bromide, hexyltrimethylammonium bromide, tetrabutyl ammonium bromide, tetradecyl trimethylammonium bromide, tetramethylammonium bromide, benzyl trimethylammonium hydroxide, phenyltrimethylammonium hydroxide, tetrabutyl ammonium hydroxide, tetraethylammonium hydroxide, tetramethylammonium hydroxide, tetrapropylammonium hydroxide, tetrabutyl ammonium hydrogen sulfate, tetrabutyl ammonium tetrafluoroborate, tetramethylammonium thiocyanate, and tetramethylammonium-p-toluene sulfonate. A base is further preferably tetramethylammonium hydroxide, which is available at a low price.

The amount of a base used is preferably 0.001 to 1.0 equivalent and more preferably 0.005 to 0.5 equivalents with respect to the total mole number of at least one compound selected from the group consisting:
wherein the compound being selected from the group consisting of:
a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group; a compound represented by Formula (2):

$$R^4Si(OR^5)_3 \qquad (2)$$

where $R^4$ represents a hydrocarbon group, a glycidyl group, or a methacryloyl group, and
$R^5$ represents a hydrocarbon group; and
a compound represented by Formula (3):

$$Si(OR^6)_4 \qquad (3)$$

where $R^6$ represents a hydrocarbon group.

When the amount is 0.001 equivalent or more, the reaction proceeds smoothly. When the amount is 1.0 equivalent or less, favorable productivity of a silicone polymer is achieved, which is economically preferable.

When a silicone polymer is obtained by a hydrolysis-condensation reaction from at least one compound selected from the group consisting of:
a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group;
a compound represented by Formula (2):

$$R^4Si(OR^5)_3 \qquad (2)$$

where $R^4$ represents a hydrocarbon group, a glycidyl group, or a methacryloyl group, and
$R^5$ represents a hydrocarbon group; and
a compound represented by Formula (3):

$$Si(OR^6)_4 \qquad (3)$$

where $R^6$ represents a hydrocarbon group,
the amount of water added is preferably 0.01 to 100 mol and more preferably 0.1 to 30 mol with respect to the total mole number of at least one compound selected from the group consisting of:
a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group;
a compound represented by Formula (2):

$$R^4Si(OR^5)_3 \qquad (2)$$

where $R^4$ represents a hydrocarbon group, a glycidyl group, or a methacryloyl group, and
$R^5$ represents a hydrocarbon group; and
a compound represented by Formula (3):

$$Si(OR^6)_4 \qquad (3)$$

where $R^6$ represents a hydrocarbon group.
When the amount added is 0.01 mol or more, the reaction proceeds smoothly. When the amount added is 100 mol or less, favorable productivity of a silicone polymer is achieved, which is economically preferable.

In the hydrolysis-condensation reaction, an organic solvent may be used. Examples of an organic solvent that can be used include: aprotic solvents such as toluene and xylene; ke-tone-based solvents such as methylethylketone and methylisobutyl ketone; alcohol solvents such as methanol, ethanol, and 2-propanol; and ether solvents such as diethylether and tetrahydrofuran. In addition, high-boiling solvents such as propylene glycol monomethylether, propylene glycol monomethylether acetate, diethylene glycol monomethylether, and ethyl lactate may be used. When an aprotic solvent is used, it is possible to induce a hydrolysis-condensation reaction with the addition of a water-soluble alcohol solvent. Two or more organic solvents may be used.

As a condition for the hydrolysis-condensation reaction, the reaction temperature is preferably 0° C. to 100° C. and more preferably 20° C. to 80° C. When the reaction temperature is 0° C. or higher, the hydrolysis-condensation reaction is completed within a short period of time. When the reaction temperature is 100° C. or lower, industrialization is facilitated.

In the hydrolysis-condensation reaction, a base may be added dropwise to a silicon compound, or a silicon compound may be added dropwise to a base or an organic solvent, ion-exchange water or the like containing a base.

The reaction time for the hydrolysis-condensation reaction may be determined such that a silicone polymer having a desired molecular weight can be obtained. It is preferably 0.5 to 48 hours and more preferably 1 to 30 hours. When the reaction time is 0.5 hours or longer, the hydrolysis-condensation reaction proceeds. When it is 48 hours or shorter, the time required for production of a silicone polymer is short, which is economically preferable.

A base that is most appropriate for the hydrolysis-condensation reaction is used. Preferably, a silicon-containing compound is obtained, a base is substantially remove, and then, a solvent or the like is removed. An organic acid is added before concentration, thereby making it possible to prevent denaturation of a silicone polymer during high-temperature concentration.

When a base is substantially removed by an operation of base removal, it means that a base used in the reaction remains in an amount corresponding to 0.1% by mass or less and preferably 0.01% by mass or less with respect to the amount of a base added to a silicon-containing compound at the start of the reaction.

Examples of a process for base removal include a process in which a base is neutralized with an equivalent or larger amount of an acid, a process involving washing with ion-exchange water, and a process using an ion-exchange resin. These processes may be used singly or in combination at least once depending on a base used in the reaction. An organic solvent may be used when these processes are conducted.

Examples of an organic solvent that can be used include: aprotic solvents such as toluene and xylene; ketone-based solvents such as methylethylketone and methylisobutyl ketone; alcohol solvents such as methanol, ethanol, and 2-propanol; ether solvents such as diethylether and tetrahydrofuran; and solvents such as acetic acid ethyl. Other examples include high-boiling solvents such as propylene glycol monomethylether, propylene glycol monomethylether acetate, diethylene glycol monomethylether, and ethyl lactate.

According to the process of producing a silicone polymer, an organic acid content is 0.0001 to 0.03 parts by weight with respect to 100 parts by weight of a silicone polymer after hydrolyzing/condensating a specific compound in the presence of a base.

By containing an organic acid, it is possible to, for example, prevent denaturation of a silicone polymer such as a change in the weight-average molecular weight due to a heating operation during concentration, thereby obtaining a desired silicone polymer.

In the process of producing a silicone polymer, it is preferable to remove a base after hydrolyzing/condensating. It is more preferable to remove a solvent or the like used in a hydrolysis-condensation reaction or a solvent or the like used in an operation of base removal.

According to the process of producing a silicone polymer, it is preferable to add an organic acid to a silicone polymer after hydrolyzing/condensating in the presence of a base, thereby adjusting the organic acid content of 0.0001 to 0.03 parts by weight with respect to 100 parts by weight of the silicone polymer.

According to the process of producing a silicone polymer, when an organic acid is used in an operation of base removal, it is preferable to use the organic acid used in the operation of base removal as such. In addition to the organic acid used in the operation of base removal, an organic acid of the same type may be added. Further, in addition to the organic acid used in the operation of base removal, a different organic acid may be added.

Examples of an organic acid include acetic acid, propionic acid, butanoic acid, penta-noic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linolic acid, linolenic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid, tartaric acid, succinic acid, and glutaric acid. Of these, preferable examples include oxalic acid, maleic acid, methylmalonic acid, adipic acid, oleic acid, stearic acid, linolic acid, linolenic acid, salicylic acid, benzoic acid, p-aminobenzoic acid, p-toluenesulfonic acid, benzenesulfonic acid, malonic acid, phthalic acid, fumaric acid, citric acid, tartaric acid, succinic acid, and glutaric acid, and further preferable examples include oxalic acid, maleic acid, salicylic acid, benzoic acid, malonic acid, phthalic acid, fumaric acid, citric acid, tartaric acid, succinic acid, and glutaric acid.

Preferably, an organic acid is a divalent or higher valent organic acid such as oxalic acid, maleic acid, methylmalonic acid, adipic acid, sebacic acid, mellitic acid, malonic acid, phthalic acid, fumaric acid, citric acid, tartaric acid, succinic acid, or glutaric acid because such organic acid is not removed with a solvent during concentration. Preferable examples of an organic acid include oxalic acid, maleic acid, malonic acid, phthalic acid, fumaric acid, and citric acid. These acids may be used singly or in combination of two or more types.

The organic acid content is 0.0001 to 0.03 parts by weight with respect 100 parts by weight of a silicone polymer. Preferably, the organic acid content is 0.0001 to 0.01 parts by weight with respect to 100 parts by weight of a silicone polymer. When the organic acid content is less than 0.0001 parts by weight with respect to 100 parts by weight of a silicone polymer, the effect of adding an organic acid cannot be obtained. When the organic acid content is more than 0.03 parts by weight with respect to 100 parts by weight of a silicone polymer, an organic acid added functions as a catalyst, causing denaturation of a silicone polymer or loss of properties of a silicone polymer.

When a solvent used in a hydrolysis-condensation reaction or an operation of base removal is removed by concentration, a process for concentration can be heating, depressurization, or a combination of heating and depressurization.

The heating temperature during concentration can be changed depending on the boiling point of a solvent be used. It is preferably 30° C. to 150° C. and more preferable 30° C. to 100° C. It is also preferable to reduce the temperature by depressurization. When the heating temperature is not less than 30° C., concentration can be carried out smoothly. When the heating temperature is not more than 150° C., industrialization is facilitated.

When a solvent used in a hydrolysis-condensation reaction or an operation of base removal is removed by concentration, the amount of the solvent removed is controlled to adjust the silicone polymer concentration to preferably 20% to 99% and more preferably 30% to 99%.

EXAMPLES

Hereinafter, our process is specifically described with reference to the Examples.

For measurement, the apparatuses described below were used, and commonly used reagents purchased from reagent manufacturers (Tokyo Chemical Industry Co., Ltd., Wako Pure Chemical Industries, Ltd., Nacalai Tesque Inc., and Shin-Etsu Chemical Co., Ltd.) were used as starting materials in the following Examples.

Measurement of Weight-Average Molecular Weight (Mw)

An HLC-8220GPC system (manufactured by Tosoh Corporation) was used. TSK gel Super HZ3000, TSK gel Super HZ2000, and TSK gel 1000 (each manufactured by Tosoh Corporation) were used as columns. RI detection was conducted. TSK gel Super H-RC was used as a reference column. Tetrahydrofuran was used as a solvent. The flow rate was 0.35 mL/min for each of the columns and the reference column. The measurement temperature was 40° C. for a plunger pump and each column. For sample preparation, approximately 0.025 g of a silicone polymer containing hydroxyl groups was diluted with 10 ml of tetrahydrofuran, and 1 μL of the diluted solution was poured. For calculation of molecular weight distribution, TSK standard polystyrene (A-500, A-1000, A-2500, A-5000, F-1, F-2, F-4, F-10, F-20, F-40, or F-8 manufactured by Tosoh Corporation) was used as a standard substance.

Solid Content Measurement

A silicone polymer solution in an amount of 1.0 g was calcined at 175° C. for 1 hour for measurement of the solid content with respect to 1.0 g of a silicone polymer, thereby determining the solid content concentration of the silicone polymer.

Organic Acid Concentration

ICS-2000 (manufactured by Nippon Dionex K.K.) was used. IonPac AG-11-HC and IonPac AS11-HC (each manufactured by Nippon Dionex K.K.) were used as columns. Detection was conducted at electric conductivity using potassium hydroxide and ultrapure water as solvents at a flow rate of 1.25 mL/min. The measurement temperature was 30° C. For sample preparation, approximately 0.7 g of a silicone polymer, 0.1 g of toluene, and 0.7 g of ultrapure water were mixed, and 25 μL of the obtained aqueous layer was poured.

Synthesis Example 1

Synthesis of Silicone Polymer of 3-methacryloxypropyltrimethoxysilane (A-1)

Into a 3-L four-necked flask equipped with a stirrer, a reflux condenser, a dropping funnel, and a thermometer, 18.0 g of a 25% tetramethylammonium hydroxide aqueous solution, 126.0 g of ion-exchange water, 178.8 g of 2-propanol, and 1132.5 g of methylisobutyl ketone were introduced. The temperature was increased to 40° C., and 596.0 g of 3-methacryloxypropyltrimethoxysilane was added dropwise using a dropping funnel over 2.0 hours. Thereafter, a reaction was conducted at 40° C. for 24 hours. After the reaction, a 1% citric acid solution was added for neutralization, followed by liquid separation. To the separated oil layer, 464.9 g of ion-exchange water was added and stirred, followed by liquid separation. The operation was conducted again twice in the same manner, thereby obtaining 1145.0 g of a silicone polymer solution of 3-methacryloxypropyltrimethoxysilane (solid content: 20%). The resulting silicone polymer solution was designated as (A-1).

Synthesis Example 2

Synthesis of Silicone Polymer of 3-glycidoxypropyltrimethoxysilane and methyltrimethoxysilane (A-2)

Into a 5-L four-necked flask equipped with a stirrer, a reflux condenser, a dropping funnel, and a thermometer, 36.8 g of a 25% tetramethylammonium hydroxide aqueous solution, 103.8 g of ion-exchange water, 297.1 g of 2-propanol, and 1881.5 g of methylisobutyl ketone were introduced. The temperature was increased to 40° C. and, then, 794.1 g of 3-glycidoxypropyltrimethoxysilane and 196.2 g of methyltrimethoxysilane were added dropwise using a dropping funnel over 1.5 hours. Thereafter, a reaction was conducted at 40° C. for 21 hours. After the reaction, a 1% citric acid solution was added for neutralization, followed by liquid separation. To the separated oil layer, 742.7 g of ion-exchange water was added and stirred, followed by liquid separation. As a result, 3250.1 g of a silicone polymer solution of 3-glycidoxypropyltrimethoxysilane and methyltrimethoxysilane (solid content: 20%) was obtained. The resulting silicone polymer solution was designated as (A-2).

Synthesis Example 3

Synthesis of Silicone Polymer of 4-methoxybenzyltrimethoxysilane and methyltrimethoxysilane (A-3)

Into a 5-L four-necked flask equipped with a stirrer, a reflux condenser, a dropping funnel, and a thermometer, 21.9 g of a 25% tetramethylammonium hydroxide aqueous solution, 81.1 g of ion-exchange water, 604.1 g of 2-propanol, and 604.1 g of toluene were introduced. The temperature was increased to 40° C., and then, 440.6 g of 4-methoxybenzyltrimethoxysilane and 163.5 g of methyltrimethoxysilane were added dropwise using a dropping funnel over 1.5 hours. Thereafter, a reaction was conducted at 40° C. for 4 hours. After the reaction, a 1% citric acid solution was added for neutralization. Further, 1208.2 g of toluene and 302.0 g of ion-exchange water were added and stirred, followed by liquid separation. To the separated oil layer, 471.2 g of ion-exchange water was added and stirred, followed by liquid separation. As a result, 2511.0 g of a silicone polymer solution of 4-methoxybenzyltrimethoxysilane and methyltrimethoxysilane (solid content: 16%) was obtained. The resulting silicone polymer solution was designated as (A-3).

Synthesis Example 4

Synthesis of Silicone Polymer of Phenyltrimethoxysilane, Methyltrimethoxysilane, and, Tetramethoxysilane (A-4)

Into a 5-L four-necked flask stirrer equipped with a reflux condenser, a dropping funnel, and a thermometer, 512.3 g of 2-propanol, 512.3 g of methylisobutyl ketone, 286.1 g of methyltrimethoxysilane, 333.1 g of phenyltrimethoxysilane, and 63.9 g of tetramethoxysilane were introduced. The temperature was increased to 25° C. and, then, 270.6 g of a 25% tetramethylammonium hydroxide aqueous solution was added dropwise using a dropping funnel over 1.5 hours. Thereafter, a reaction was conducted at 25° C. for 20 hours. Into a 5-L four-necked flask equipped with a stirrer, a reflux condenser, a dropping funnel, and a thermometer, 27.8 g of 35% hydrochloric acid, 683.1 g of ion-exchange water, and 1366.2 g of methylisobutyl ketone were introduced. After the reaction, the reaction solution was added dropwise to a 5-L four-necked flask containing hydrochloric acid and the like for neutralization, followed by liquid separation. To the separated oil layer, 683.1 g of ion-exchange water was added and stirred, followed by liquid separation. The operation was conducted again once in the same manner. As a result, 2671.0 g of a silicone polymer of phenyltrimethoxysilane, methyltrimethoxysilane, and tetramethoxysilane (solid content: 14%) was obtained. The resulting silicone polymer solution was designated as (A-4).

Synthesis Example 5

Synthesis of Silicone Polymer of Phenyltrimethoxysilane, Methyltrimethoxysilane, and, Tetramethoxysilane (A-5)

Into a 5-L four-necked flask stirrer equipped with a reflux condenser, a dropping funnel, and a thermometer, 347.7 g of 2-propanol, 1738.5 g of methylisobutyl ketone, 158.0 g of methanol, 272.4 g of methyltrimethoxysilane, 238.0 g of phenyltrimethoxysilane, and 121.8 g of tetramethoxysilane were introduced. The temperature was increased to 25° C. and, then, 266.0 g of a 25% tetramethylammonium hydroxide aqueous solution was added dropwise using a dropping funnel over 1.5 hours. Thereafter, a reaction was conducted at 25° C. for 20 hours. Into another 5-L four-necked flask equipped with a stirrer, a reflux condenser, a dropping funnel, and a thermometer, 27.4 g of 35% hydrochloric acid and 632.2 g of ion-exchange water were introduced. After the reaction, the reaction solution was added dropwise to a 5-L four-necked flask containing hydrochloric acid and the like for neutralization, followed by liquid separation. To the separated oil layer, 632.1 g of ion-exchange water was added and stirred, followed by liquid separation. The operation was conducted again once in the same manner. As a result, 2390.8 g of a silicone polymer of phenyltrimethoxysilane, methyltrimethoxysilane, and tetramethoxysilane (solid content: 14%) was obtained. The resulting silicone polymer solution was designated as (A-5).

Table 1 lists the compounds used in the Synthesis Examples, the mixing ratios thereof, and the obtained silicone polymers. In addition, Table 1 lists the following compounds with the corresponding denotations:

(B-1): 3-Methacryl oxypropyltrimethoxysilane
(B-2): 3-Glycidoxypropyltrimethoxysilane
(B-3): Methyltrimethoxysilane
(B-4): 4-Methoxyb enzyltrimethoxysilane
(B-5): Phenyltrimethoxysilane
(B-6): Tetramethoxysilane.

TABLE 1

| | Silicone polymer | Compound used | Mixing ratio of compound (mol %) | Weight-average molecular weight (Mw) |
|---|---|---|---|---|
| Synthesis Example 1 | A-1 | B-1 | 100 | 2180 |
| Synthesis Example 2 | A-2 | B-2 | 70 | 2990 |
| | | B-3 | 30 | |
| Synthesis Example 3 | A-3 | B-4 | 70 | 2880 |

TABLE 1-continued

| | Silicone polymer | Compound used | Mixing ratio of compound (mol %) | Weight-average molecular weight (Mw) |
|---|---|---|---|---|
| Example 3 | | B-3 | 30 | |
| Synthesis Example 4 | A-4 | B-5 | 40 | 2530 |
| | | B-3 | 50 | |
| | | B-6 | 10 | |
| Synthesis Example 5 | A-5 | B-5 | 30 | 2450 |
| | | B-3 | 50 | |
| | | B-6 | 20 | |

Example 1

To the silicone polymer solution (A-1) obtained in Synthesis Example 1, citric acid was added as an organic acid in an amount of 0.005 parts by weight with respect to 100 parts by weight of the silicone polymer. Concentration was performed under reduced pressure until the solid content concentration reached 99% at 90° C. for 30 hours. The weight-average molecular weight (Mw) before concentration was 2180 and the weight-average molecular weight (Mw) after concentration was 2180, meaning that there was no change.

Example 2

The operation was conducted in the same manner as in Example 1 except that the organic acid was changed to fumaric acid. Table 2 lists the results.

Comparative Example 1

The operation was conducted in the same manner as in Example 1 except that no organic acid was used. Table 2 lists the results.

TABLE 2

| | Silicone polymer [Part by weight] | Organic acid [Part by weight] | Before concentration Weight-average molecular weight (Mw) | After concentration Weight-average molecular weight (Mw) |
|---|---|---|---|---|
| Example 1 | A-1 [100] | Citric acid [0.005] | 2180 | 2180 |
| Example 2 | A-1 [100] | Fumaric acid [0.005] | 2180 | 2180 |
| Comparative Example 1 | A-1 | None | 2180 | 2240 |

In the silicone polymer solution (A-1) obtained in Synthesis Example 1, there was no change in the weight-average molecular weight (Mw) before and after concentration in Example 1. There were fewer changes in the weight-average molecular weight (Mw) before and after concentration in Example 2 as compared with Comparative Example 1.

Example 3

To the silicone polymer solution (A-2) obtained in Synthesis Example 2, citric acid was added as an organic acid in an amount of 0.005 parts by weight with respect to 100 parts by weight of the silicone polymer. Concentration was performed under reduced pressure until the solid content concentration reached 99% at 90° C. for 24 hours. The weight-average molecular weight (Mw) before concentration was 2990 and the weight-average molecular weight (Mw) after concentration was 3050, meaning that there was substantially no change.

Examples 4 to 9

The operation was conducted in the same manner as in Example 3 except that type and amount of the organic acid were changed. Table 3 lists the results.

Comparative Example 2

The operation was conducted in the same manner as in Example 3 except that no organic acid was used. Table 3 lists the results.

Comparative Example 3

The operation was conducted in the same manner as in Example 3 except that citric acid used as an organic acid was added in an amount of 0.050 parts by weight with respect to 100 parts by weight of the hydrolyzed polymer. Table 3 lists the results.

TABLE 3

|  | Silicone polymer [Part by weight] | Organic acid [Part by weight] | Before concentration Weight-average molecular weight (Mw) | After concentration Weight-average molecular weight (Mw) |
|---|---|---|---|---|
| Example 3 | A-2 [100] | Citric acid [0.005] | 2990 | 3050 |
| Example 4 | A-2 [100] | Citric acid [0.010] | 2990 | 3050 |
| Example 5 | A-2 [100] | Citric acid [0.002] | 2990 | 3200 |
| Example 6 | A-2 [100] | Fumaric acid [0.005] | 2990 | 3050 |
| Example 7 | A-2 [100] | Malonic acid [0.005] | 2990 | 3170 |
| Example 8 | A-2 [100] | Salicylic acid [0.005] | 2990 | 3230 |
| Example 9 | A-2 [100] | Phthalic acid [0.005] | 2990 | 3230 |
| Comparative Example 2 | A-2 [100] | None | 2990 | 3300 |
| Comparative Example 3 | A-2 [100] | Citric acid [0.050] | 2990 | 3320 |

In the silicone polymer solution (A-2) obtained in Synthesis Example 2, there were fewer changes in the weight-average molecular weight (Mw) before and after concentration in Examples 3 to 9 compared to Comparative Examples 2 and 3.

Example 10

To the silicone polymer solution (A-3) obtained in Synthesis Example 3, citric acid was added as an organic acid in an amount of 0.005 parts by weight with respect to 100 parts by weight of the silicone polymer. Concentration was performed under reduced pressure until the solid content concentration reached 99% at 90° C. for 24 hours. The weight-average molecular weight (Mw) before concentration was 2880 and the weight-average molecular weight (Mw) after concentration was 2880, meaning that there was no change.

Examples 11 to 13

The operation was conducted in the same manner as in Example 11 except that type of the organic acid was changed. Table 4 lists the results.

Comparative Example 4

The operation was conducted in the same manner as in Example 10 except that no organic acid was used. Table 4 lists the results.

TABLE 4

|  | Silicone polymer [Part by weight] | Organic acid [Part by weight] | Before concentration Weight-average molecular weight (Mw) | After concentration Weight-average molecular weight (Mw) |
|---|---|---|---|---|
| Example 10 | A-3 [100] | Citric acid [0.005] | 2880 | 2880 |
| Example 11 | A-3 [100] | Glutaric acid [0.005] | 2880 | 2890 |
| Example 12 | A-3 [100] | Maleic acid [0.005] | 2880 | 2880 |
| Example 13 | A-3 [100] | Fumaric acid [0.005] | 2880 | 2880 |
| Comparative Example 4 | A-3 | None | 2880 | 3100 |

In the silicone polymer solution (A-3) obtained in Synthesis Example 3, there was no change in the weight-average molecular weight (Mw) before and after concentration in Examples 10, 12, and 13. There were fewer changes in the weight-average molecular weight (Mw) before and after concentration in Example 11 as compared with Comparative Example 4.

Example 14

To the silicone polymer solution (A-4) obtained in Synthesis Example 4, maleic acid was added as an organic acid in an amount of 0.001 parts by weight with respect to 100 parts by weight of the silicone polymer. Concentration was performed under reduced pressure until the solid content concentration reached 50% or more at 50° C. for 24 hours. The weight-average molecular weight (Mw) before concentration was 2880 and the weight-average molecular weight (Mw) after concentration was 3200, meaning that there was a small change.

Examples 15 to 21

The operation was conducted in the same manner as in Example 14 except that type and amount of the organic acid were changed. Table 5 lists the results.

Comparative Example 5

The operation was conducted in the same manner as in Example 14 except that no organic acid was used. Table 5 lists the results.

Comparative Examples 6 and 7

The operation was conducted in the same manner as in Example 14 except that maleic acid used as an organic acid was added in an amount of 0.050 or 0.100 parts by weight with respect to 100 parts by weight of the hydrolyzed polymer. Table 5 lists the results.

TABLE 5

|  | Silicone polymer [Part by weight] | Organic acid [Part by weight] | Before concentration Weight-average molecular weight (Mw) | After concentration Weight-average molecular weight (Mw) |
|---|---|---|---|---|
| Example 14 | A-4 [100] | Maleic acid [0.001] | 2880 | 3200 |
| Example 15 | A-4 [100] | Maleic acid [0.003] | 2880 | 3200 |
| Example 16 | A-4 [100] | Maleic acid [0.005] | 2880 | 3200 |
| Example 17 | A-4 [100] | Maleic acid [0.010] | 2880 | 3510 |
| Example 18 | A-4 [100] | Oxalic acid [0.001] | 2880 | 3370 |
| Example 19 | A-4 [100] | Citric acid [0.001] | 2880 | 3690 |
| Example 20 | A-4 [100] | Malonic acid [0.001] | 2880 | 3880 |
| Example 21 | A-4 [100] | Succinic acid [0.001] | 2880 | 4150 |
| Comparative Example 5 | A-4 | None | 2880 | 4810 |
| Comparative Example 6 | A-4 [100] | Maleic acid [0.050] | 2880 | 4260 |
| Comparative Example 7 | A-4 [100] | Maleic acid [0.100] | 2880 | 4690 |

In the silicone polymer solution (A-4) obtained in Synthesis Example 4, there were fewer changes in the weight-average molecular weight (Mw) before and after concentration in Examples 14 to 21 compared to Comparative Examples 5 to 7.

Example 22

To the silicone polymer solution (A-5) obtained in Synthesis Example 5, maleic acid was added as an organic acid in an amount of 0.005 parts by weight with respect to 100 parts by weight of the silicone polymer. Concentration was performed under reduced pressure until the solid content concentration reached 70% or more at 60° C. for 24 hours. The weight-average molecular weight (Mw) before concentration was 2450 and the weight-average molecular weight (Mw) after concentration was 2610, meaning that there was substantially no change.

Examples 23 to 26

The operation was conducted in the same manner as in Example 22 except that type and amount of the organic acid were changed. Table 6 lists the results.

Comparative Example 8

The operation was conducted in the same manner as in Example 22 except that no organic acid was used. Table 6 lists the results. The silicone polymer was solidified.

TABLE 6

|  | Silicone polymer [Part by weight] | Organic acid [Part by weight] | Before concentration Weight-average molecular weight (Mw) | After concentration Weight-average molecular weight (Mw) |
|---|---|---|---|---|
| Example 22 | A-5 [100] | Maleic acid [0.005] | 2450 | 2610 |
| Example 23 | A-5 [100] | Maleic acid [0.001] | 2450 | 2890 |
| Example 24 | A-5 [100] | Maleic acid [0.010] | 2450 | 2840 |
| Example 25 | A-5 [100] | Citric acid [0.005] | 2450 | 3330 |
| Example 26 | A-5 [100] | Glutaric acid [0.005] | 2880 | 3550 |
| Comparative Example 8 | A-5 | None | 2880 | Not analyzed because of solidification |

In the silicone polymer solution (A-5) obtained in Synthesis Example 5, the silicone polymer was solidified as the molecular weight increased in Comparative Example 8 while the silicone polymer was not solidified in Examples 22 to 26, although there were changes in the weight-average molecular weight (Mw) before and after concentration.

INDUSTRIAL APPLICABILITY

According to the process of producing a silicone polymer, it is possible to inhibit an increase in the molecular weight of a silicone polymer during high-temperature concentration in the steps of producing a silicone polymer. According to the process of producing a silicone polymer, it is possible to reduce changes in solubility of a silicone polymer in an alkaline solution during high-temperature concentration in the steps of producing a silicone polymer. A silicone polymer produced by the process of producing a silicone polymer has small increase in the molecular weight or small change in viscosity during long-term storage and, therefore, it is excellent in storage stability.

A silicone polymer produced by the process of producing a silicone polymer is useful as a heat-resistant material for electronic components such as liquid crystal display elements and semiconductor elements, and it can be further applied to a wide range of fields of paints, adhesives and the like.

The invention claimed is:
1. A process of producing a silicone polymer comprising:
hydrolyzing/condensating one or more compound(s) in the presence of a base,
a first acid addition step of adding an acid for neutralization,
adding water followed by separation,
subsequent to separation, a second acid addition step of further adding an organic acid,
adjusting the organic acid content of 0.0001 to 0.03 parts by weight with respect to 100 parts by weight of the compound(s), and
concentrating the silicone polymer from a solution containing the organic acid and the compound(s),
wherein the compound(s) is selected from the group consisting of:
a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group;

a compound represented by Formula (2):

$$R^4Si(OR^5)_3 \qquad (2)$$

where $R^4$ represents a hydrocarbon group, a glycidyl group, or a methacryloyl group, and $R^5$ represents a hydrocarbon group; and a compound represented by Formula (3):

$$Si(OR^6)_4 \qquad (3)$$

where $R^6$ represents a hydrocarbon group.

2. The process according to claim 1, wherein the compound represented by Formula (1) is dimethyldimethoxysilane, dimethyldiethoxysilane, diphenyldimethoxysilane, or diphenyldiethoxysilane.

3. The process according to claim 1, wherein the compound represented by Formula (2) is methyltrimethoxysilane, phenyltrimethoxysilane, 3-glycidoxypropyltrimethoxysilane, 3-methacryloxypropyltrimethoxysilane, or 4-methoxybenzyltrimethoxysilane.

4. The process according to claim 1, wherein the compound represented by Formula (3) is tetramethoxysilane or tetraethoxysilane.

5. The process according to claim 1, wherein the base is a quaternary ammonium salt.

6. The process according to claim 2, wherein the base is a quaternary ammonium salt.

7. The process according to claim 3, wherein the base is a quaternary ammonium salt.

8. The process according to claim 4, wherein the base is a quaternary ammonium salt.

9. The process according to claim 2, wherein the organic acid is a divalent or higher valent organic acid.

10. The process according to claim 3, wherein the organic acid is a divalent or higher valent organic acid.

11. The process according to claim 4, wherein the organic acid is a divalent or higher valent organic acid.

12. The process according to claim 2, wherein the organic acid is oxalic acid, maleic acid, malonic acid, phthalic acid, fumaric acid, or citric acid.

13. The process according to claim 3, wherein the organic acid is oxalic acid, maleic acid, malonic acid, phthalic acid, fumaric acid, or citric acid.

14. The process according to claim 4, wherein the organic acid is oxalic acid, maleic acid, malonic acid, phthalic acid, fumaric acid, or citric acid.

15. A process of producing a silicone polymer comprising:

hydrolyzing/condensating one or more compound(s) in the presence of a base,
adding an acid for neutralization,
adding water followed by separation,
further adding a divalent or higher valent organic acid,
adjusting the organic acid content of 0.0001 to 0.03 parts by weight with respect to 100 parts by weight of the compound(s), and
concentrating the silicone polymer from a solution containing the organic acid and the compound(s),
wherein the compound(s) is selected from the group consisting of:
a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group;

a compound represented by Formula (2):

$$R^4Si(OR^5)_3 \qquad (2)$$

where $R^4$ represents a hydrocarbon group, a glycidyl group, or a methacryloyl group, and $R^5$ represents a hydrocarbon group; and a compound represented by Formula (3):

$$Si(OR^6)_4 \qquad (3)$$

where $R^6$ represents a hydrocarbon group.

16. A process of producing a silicone polymer comprising:

hydrolyzing/condensating one or more compound(s) in the presence of a base,
adding an acid for neutralization,
adding water followed by separation,
further adding at least one of oxalic acid, maleic acid, malonic acid, phthalic acid, fumaric acid or citric acid as an organic acid,
adjusting the organic acid content of 0.0001 to 0.03 parts by weight with respect to 100 parts by weight of the compound(s), and
concentrating the silicone polymer from a solution containing the organic acid and the compound(s),
wherein the compound(s) is selected from the group consisting of:
a compound represented by Formula (1):

$$R^1R^2Si(OR^3)_2 \qquad (1)$$

where $R^1$ and $R^2$ each represent a hydrocarbon group, a glycidyl group, or a methacryloyl group, $R^1$ and $R^2$ may be the same or different, and $R^3$ represents a hydrocarbon group;

a compound represented by Formula (2):

$$R^4Si(OR^5)_3 \qquad (2)$$

where $R^4$ represents a hydrocarbon group, a glycidyl group, or a methacryloyl group, and $R^5$ represents a hydrocarbon group; and a compound represented by Formula (3):

$$Si(OR^6)_4 \qquad (3)$$

where $R^6$ represents a hydrocarbon group.

* * * * *